(12) United States Patent
Trotnow

(10) Patent No.: US 9,670,644 B2
(45) Date of Patent: Jun. 6, 2017

(54) DROP LINE TENSIONING ASSEMBLY

(71) Applicant: Caterpillar Global Mining LLC, Oak Creek, WI (US)

(72) Inventor: Jason J. Trotnow, West Allis, WI (US)

(73) Assignee: Caterpillar Global Mining LLC, South Milwaukee, WI (US)

( * ) Notice: Subject to any disclaimer, the term of this patent is extended or adjusted under 35 U.S.C. 154(b) by 233 days.

(21) Appl. No.: 14/470,008

(22) Filed: Aug. 27, 2014

(65) Prior Publication Data

US 2016/0060843 A1   Mar. 3, 2016

(51) Int. Cl.
| | | |
|---|---|---|
| *E02F 3/58* | (2006.01) | |
| *B66F 3/24* | (2006.01) | |
| *E02F 3/48* | (2006.01) | |
| *F16G 11/12* | (2006.01) | |
| *B66C 13/04* | (2006.01) | |
| *B66C 13/06* | (2006.01) | |

(52) U.S. Cl.
CPC ............. *E02F 3/58* (2013.01); *B66C 13/04* (2013.01); *B66C 13/066* (2013.01); *B66F 3/24* (2013.01); *E02F 3/48* (2013.01); *F16G 11/12* (2013.01)

(58) Field of Classification Search
CPC ... B64C 13/00; B64C 13/30; Y10T 74/20408; Y10T 403/32426; Y10T 403/54; B23P 2700/04; B60G 2206/111; F16C 7/06; E02F 3/58; E02F 3/48; B66C 13/04; B66C 13/066; F16G 11/12; B66F 3/24

USPC .............. 74/570 R, 586; 254/233, 93 A
See application file for complete search history.

(56) References Cited

U.S. PATENT DOCUMENTS

| | | | | |
|---|---|---|---|---|
| 2,861,332 A * | 11/1958 | Hayden | ............. | E04H 12/20 |
| | | | | 254/29 R |
| 4,004,777 A * | 1/1977 | Despas | ............. | F16G 11/12 |
| | | | | 254/93 A |
| 5,226,249 A * | 7/1993 | Pippins | ............. | E02F 3/58 |
| | | | | 200/332 |
| 7,097,154 B2 * | 8/2006 | Stevens | ............. | B25B 25/00 |
| | | | | 174/40 TD |
| 7,415,783 B2 * | 8/2008 | Huffman | ............. | E02F 3/58 |
| | | | | 212/272 |
| 8,192,129 B1 | 6/2012 | Orgeron | | |
| 8,272,151 B2 * | 9/2012 | Ries | ............. | E02F 3/48 |
| | | | | 37/395 |
| 2013/0146401 A1 * | 6/2013 | Ma | ............. | B60T 7/108 |
| | | | | 188/72.1 |

FOREIGN PATENT DOCUMENTS

| | | |
|---|---|---|
| CN | 101839780 | 9/2010 |
| GB | 1211207 | 11/1970 |

* cited by examiner

*Primary Examiner* — Robert Pezzuto
*Assistant Examiner* — Jessica H Lutz

(57) ABSTRACT

A tensioning assembly including a primary rod and a hydraulic jack. The primary rod being positioned adjacent to a center section of the hydraulic jack. The tensioning assembly further including a frame housing anchored to the hydraulic jack. The tensioning assembly also includes a link rod connected to the primary rod and a primary adjusting and a secondary adjusting nut associated with the link rod to adjust the tension of a cable or line.

18 Claims, 2 Drawing Sheets

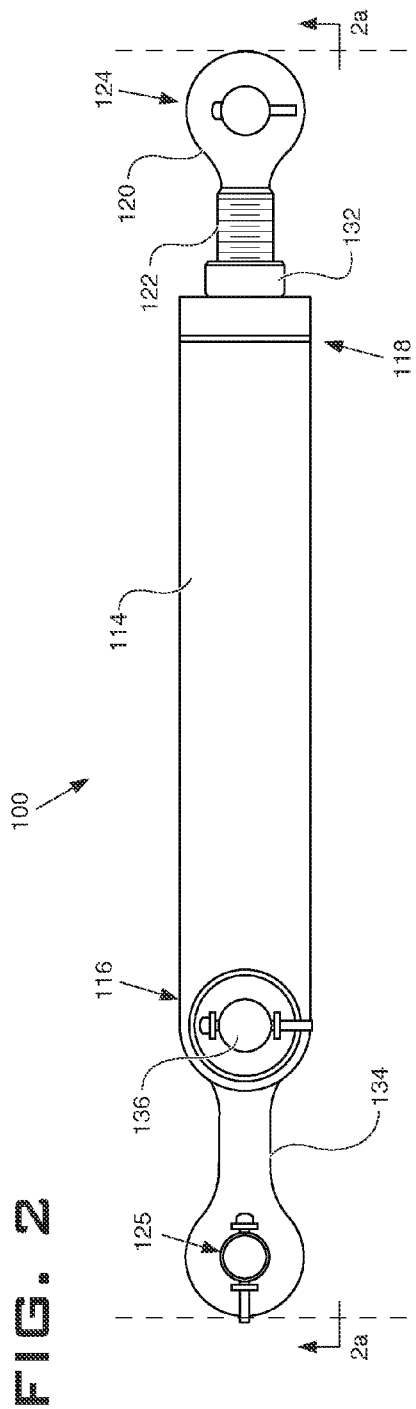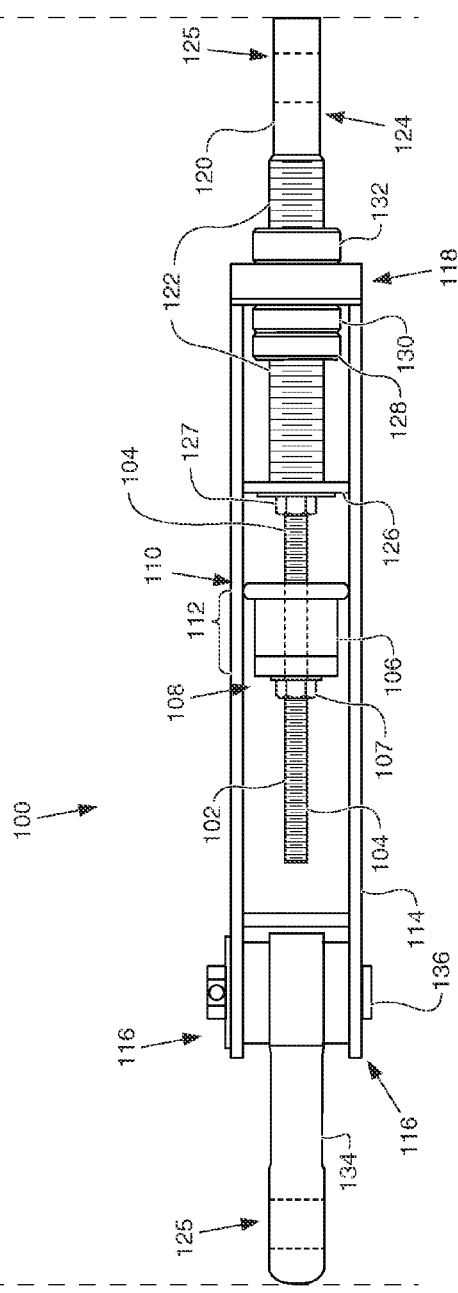

DROP LINE TENSIONING ASSEMBLY

TECHNICAL FIELD

The present disclosure generally relates to tensioning assemblies, and more particularly relates to a drop line tensioning assembly that helps control oscillation amplitudes of suspension lines associated with a dragline machine.

BACKGROUND

A dragline is a machine used for surface mining overburden material (e.g., rocks, soil, etc.). A typical dragline machine includes a large bucket suspended from a boom connected to a machinery house mounted on a platform. The boom is supported by suspension lines (also referred to as cables or ropes) that hold the boom at a specified angle of inclination. The suspension lines extend from a gantry (a frame bridgework over which the cables run to the boom). Hoist lines extend from the end of the boom to the bucket. The path of the bucket is controlled with the hoist lines, as well as drag lines that extend from the bucket to the machinery house. A dump line mechanism controls the dumping action by adjusting the tension of the drag lines.

In operation, a typical excavation process includes positioning the bucket above overburden material, lowering the bucket, and drawing the drag and hoist lines to scrap the bucket along the overburden material. Once the bucket is full, the operator adjusts the hoist and drag lines, swings the bucket to a dump site, and releases the drag line to empty the bucket. During the process, the suspension lines, hoist lines, and drag lines are placed in compression and tension cycles. Uncontrolled, the compression and tension cycles can have substantial oscillation amplitudes that snap lines and create vibrations leading to excessive wear on the dragline's various joints located throughout the machine. In order to help control the oscillation amplitudes, some draglines include drop lines connected to the suspension lines. However, conventional apparatuses and methods for adjusting the tension of the drop lines have proved burdensome and ineffective. For example, U.S. Pat. No. 7,415,783B2 discloses an apparatus including a boom support strand oscillation dampening mechanism. U.S. Pat. No. 7,415,783B2 further discloses that the damping mechanism is located 5/12 of the way down from the top of the boom, between the center and upper sections of the boom. The dampening mechanism includes a left brace, and a right brace spaced apart from the left brace and a stretchable rope extending between the boom and each brace.

The foregoing background discussion is intended solely to aid the reader. It is not intended to limit the innovations described herein, nor to limit or expand the prior art discussed. Consequently, the foregoing discussion should not be taken to indicate that any particular element of a prior system is unsuitable for use with the innovations described herein, nor is it intended to indicate that any element is essential in implementing the innovations described herein. The implementations and application of the innovations described in the disclosure are defined by the appended claims.

SUMMARY

In one aspect, the present disclosure provides a tensioning assembly for a dragline machine. The tensioning assembly includes a primary rod and a hydraulic jack having a first end, a second end, and a center section extending between the first end and the second end of the hydraulic jack. The primary rod is positioned adjacent to the center section of the hydraulic jack. The tensioning assembly further includes a frame housing having a first end and a second end. The frame housing is anchored to the second end of the hydraulic jack between the first end and the second end of the frame housing. A hydraulic jack nut is positioned adjacent to the first end of the hydraulic jack. The tensioning assembly also includes a first link rod having a threaded portion and a connection end. The connection end of the first link rod is connected to a line attached to the dragline machine. A lock plate connects the primary rod to the first link rod. A primary adjusting nut is connected to the threaded portion of the first link rod. A secondary adjusting nut is connected to the threaded portion of the first link rod. The secondary adjusting nut is positioned between the primary adjusting nut and the connection end of the first link rod.

In another aspect, the present disclosure provides a drop line tensioning assembly including a primary rod having a threaded portion. The drop line tensioning assembly further includes a hydraulic jack having a first end, a second end, and a center section located between the first end and the second end. The primary rod is positioned adjacent to the center section of the hydraulic jack. A hydraulic jack nut adjacent to the first end of the hydraulic jack. The hydraulic jack nut attaches to the threaded portion of the primary rod. The drop line tensioning assembly also includes a frame housing having a first end and a second end. The frame housing is anchored to the second end of the hydraulic jack. The drop line tensioning assembly further includes a first link rod having a threaded portion and a connection end. A lock plate connects the primary rod to the first link rod. A first adjusting nut is threaded onto the threaded portion of the first link rod. A second adjusting nut is threaded onto the threaded portion of the first link rod. A third adjusting nut is threaded onto the threaded portion of the first link rod. The second adjusting nut is positioned between the first adjusting nut and the third adjusting nut.

In yet another aspect, the present disclosure provides a method for retrofitting a dragline machine with a drop line tensioning assembly including attaching a drop line tensioning assembly to a boom and a drop line of the dragline machine. The drop line tensioning assembly including a primary rod and a hydraulic jack having a first end, a second end, and a center section located between the first end and the second end. The primary rod is positioned adjacent to the center section of the hydraulic jack. The drop line tensioning assembly includes a frame housing having a first end and a second end. The frame housing is anchored to the second end of the hydraulic jack between the first end and the second end of the frame housing. A hydraulic jack nut is positioned adjacent to the first end of the hydraulic jack. The drop line tensioning assembly further includes a first link rod having a threaded portion and a connection end. The connection end is connected to a line attached to the dragline machine. A lock plate connects the primary rod to the first link rod. A primary adjusting nut connects to the threaded portion of the first link rod. A secondary adjusting nut connects to the threaded portion of the first link rod. The secondary adjusting nut is positioned between the primary adjusting nut and the connection end of the first link rod.

Other features and aspects of this disclosure will be apparent from the following description and the accompanying drawings.

BRIEF DESCRIPTION OF THE DRAWINGS

FIG. 2 is a first side view of a drop line tensioning assembly in isolation; and FIG. 2A is a top view of a drop line tensioning assembly in isolation.

Figure 1:
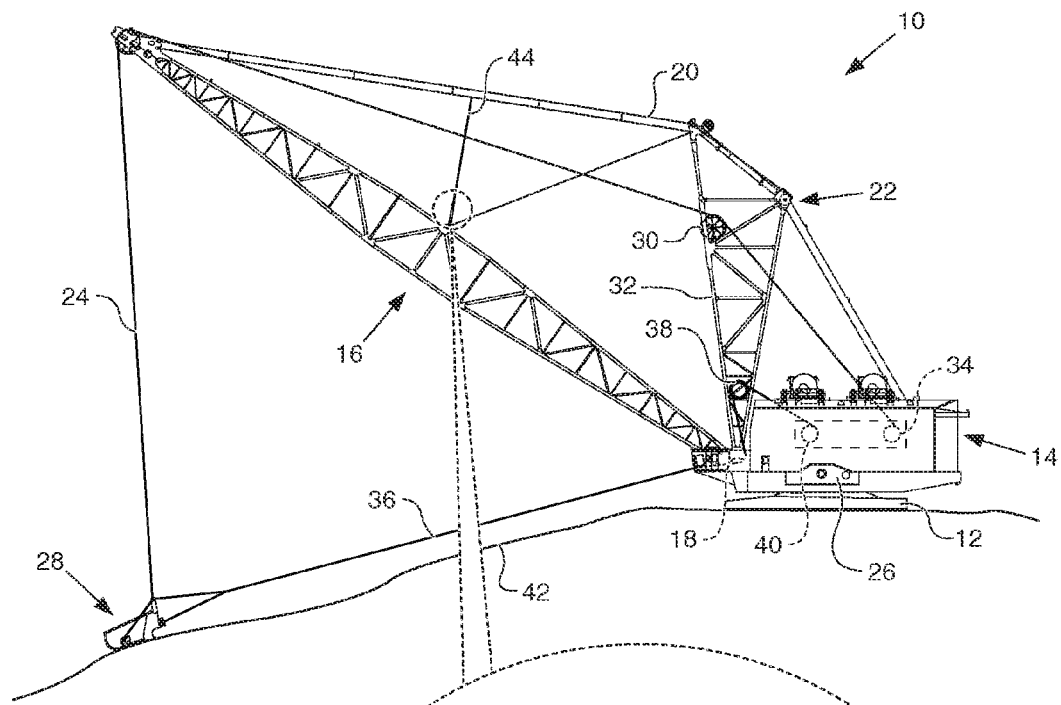
FIG. 1 is a schematic side view of a dragline machine within which one or more embodiments of the present disclosure may be implemented.

While the disclosure is susceptible to various modifications and alternative forms, specifics have been shown by way of example in the drawings and will be described in detail below. It should be understood that the detailed description is not to limit aspects of the disclosure to the particular embodiments described. On the contrary, the disclosure covers all modifications, equivalents, and alternatives falling within the spirit and scope of the disclosure.

DETAILED DESCRIPTION

The present disclosure relates to a drop line tensioning assembly 100 that helps control oscillation amplitudes of suspension lines 20 associated with a dragline machine 10. Wherever possible the same reference numbers will be used throughout the drawings to refer to the same or like parts. Moreover, references to various elements described herein are made collectively or individually when there may be more than one element of the same type. However, such references are merely exemplary in nature. Accordingly, it may be noted that any such reference to elements in the singular is also to be construed to relate to the plural and vice-versa without limiting the scope of the disclosure to the exact number or type of such elements unless set forth explicitly in the appended claims.

FIG. 1 shows a dragline machine 10 within which one or more embodiments of the present disclosure may be implemented. Dragline machine 10 is configured to remove overburden material. Dragline machine 10 includes a base 12 in contact with ground 42, also referred to as overburden material. Base 12 supports machinery housing 14 having a boom 16 projecting upwardly from the lower front of machinery housing 14. Boom 16 is connected to machinery housing 14 with foot pins 18. Boom 16 is positioned at an angle of inclination by suspension lines 20 (also referred to as pendants) extending from boom 16 to a gantry 22 mounted to machinery housing 14. Drop line 44 connects suspension lines 20 to boom 16 as will be discussed in more detail below.

A bucket 28 is suspended by hoist line 24 which passes over sheaves 30 on the gantry legs 32 to wind on hoist drum 34 in the machinery housing 14. Bucket 28 may be dragged toward the dragline machine 10 by drag line(s) 36 passing over fairlead(s) 38 near the foot pin(s) 18 and onto drag drum 40 within machinery housing 14. The machinery housing 14 is rotatably supported on base 12 by circular roller gear 26. Base 12 may also be referred to as a walking mechanism and includes a shoe portion that is driven internally by a drive system including an internal motor and gear assembly (not shown).

Dragline machine 10 may move bucket 28 along a digging path by taking up and paying out the hoist line 24 and drag line 36 with drum 40 and hoist drum 34. The machinery housing 14 and the boom 16 may be rotated to align the bucket 28 with the overburden material 42. The hoist line 24 and the drag line 36 are slackened (i.e., paid out) to lower the bucket 28 onto overburden material 42. The bucket 28 is then drawn across the overburden material 42 towards the machinery housing 14 by taking up the drag line 36. Tension on hoist line 24 controls the digging depth of the bucket 28. Overburden material 42 fills bucket 28 as it pulled towards the machinery housing 14. Once the bucket 28 is filled, it is lifted from the ground 42 by taking up the hoist line 24 and maneuvered to a dump location. The bucket 28 is emptied by actuating a dump valve (not shown), allowing the weight of the bucket 28 to rotate the front end of the bucket 28 downward to empty the overburden material 42 from bucket 28.

Figure 1A:
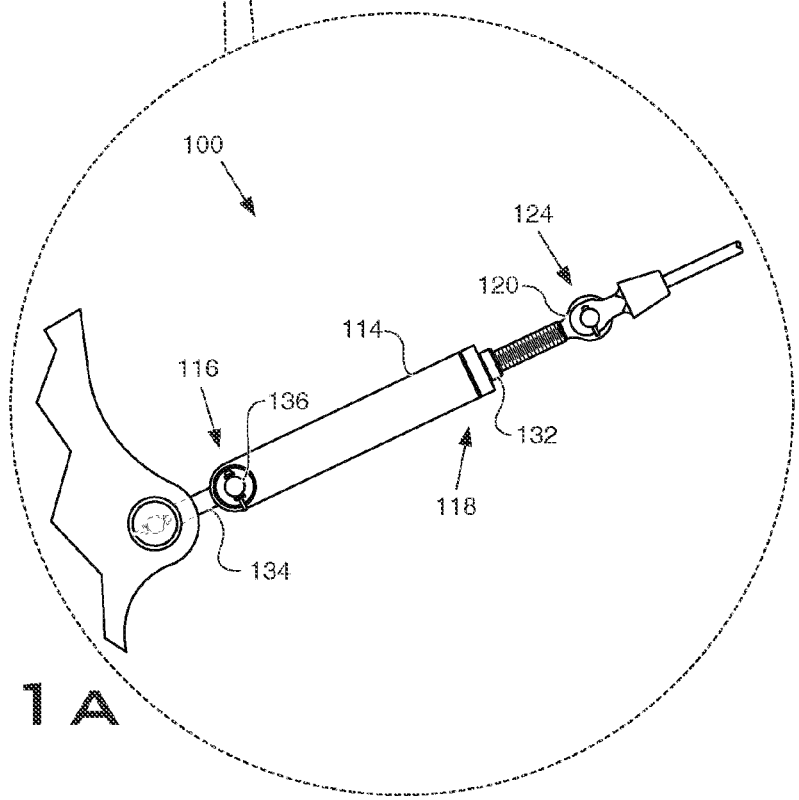
FIG. 1A is a schematic view of a drop line tensioning assembly attached to a dragline machine.

Having generally discussed an overview of dragline machine 10, embodiments of the drop line tensioning assembly 100 will now be discussed in more detail. FIG. 1A is a schematic view of drop line tensioning assembly 100 attached to the dragline machine 10. FIG. 2 is a first side view of the drop line tensioning assembly 100 in isolation, and FIG. 2A is a top view of the drop line tensioning assembly 100 in isolation.

Referring now to FIGS. 1A, 2, and 2A interchangeably. As shown, drop line tensioning assembly 100 helps control oscillation amplitudes of suspension lines 20 on dragline machine 10. Drop line tensioning assembly 100 may include a primary rod 102 having a threaded portion 104. The drop line tensioning assembly 100 further includes a hydraulic jack 106 having a first end 108, a second end 110, and a center section 112 located between the first end 108 and the second end 110. In some embodiments, the hydraulic jack 106 may include plunger cylinders to maintain appropriate pressure levels within the hydraulic jack 106. The primary rod 102 is positioned adjacent to the center section 112 of the hydraulic jack 106. A hydraulic jack nut 107 is positioned adjacent to the first end 108 of the hydraulic jack 106. The hydraulic jack nut 107 attaches to the threaded portion 104 of the primary rod 102.

The drop line tensioning assembly 100 also includes a frame housing 114 having a first end 116 and a second end 118. The frame housing 114 is anchored to the second end 110 of the hydraulic jack 106. In other embodiments, the frame housing 114 may be anchored to the hydraulic jack 106 at other locations such as the first end 108 of the hydraulic jack 106. A first link rod 120 having a threaded portion 122 and a connection end 124 is operatively associated with frame housing 114. The connection end 124 of the first link rod 120 may be connected to drop line 44. As shown, drop line 44 is position through eye 125 of first link rod 120. While eye 125 is shown as circular, other configurations and configurations for connecting first link rod 120 to drop line 44 are acceptable, as would be understood by a person having ordinary skill in the art.

A lock plate 126 connects the primary rod 102 to the first link rod 120. The lock plate 126 may be welded to the threaded portion 122 of first link rod 120 or be screwed into or onto the threaded portion 122 of first link rod 120. As shown, lock plate 126 includes lock plate nut 127 for attaching primary rod 102 to first link rod 120. In yet other embodiments, lock plate 126 may be connected to first link rod 120 with a locking pin (not shown). A first adjusting nut 128 is threaded onto the threaded portion 122 of the first link rod 120. The first adjusting nut 128 may also be referred to as the primary adjusting nut 128. A second adjusting nut 130 is threaded onto the threaded portion 122 of the first link rod 120. In some instances, the first adjusting nut 128 and second adjusting nut 130 may be replaced with a single primary adjusting nut 128. A third adjusting nut 132 is threaded onto the threaded portion 122 of the first link rod 120. The third adjusting nut 132 may also be referred to as a secondary adjusting nut 132. The thread-pitch of the threads for components described herein may be those described by the Unified National Standard, including coarse-pitch threads, fine-pitch threads, or other thread arrangements—as would be understood by a person having ordinary skill in the art. In some embodiments, the second adjusting nut 130 is positioned between the first adjusting nut 128 and the third adjusting nut 132. The components of the drop line tensioning assembly 100 may be formed of a rigid material, such as steel, iron, or other high tensile strength metallic material. It is also contemplated that the drop line tensioning assembly 100 may be formed from other high strength materials.

In some embodiments, frame housing 114 houses primary rod 102, hydraulic jack 106, lock plate 126, and primary adjusting nut 128. The frame housing 114 may further house other components including those shown in FIGS. 1A, 2, and 2A. The first end 116 of frame housing 114 may also connect to a second link rod 134. The frame housing 114 may be connected to second link rod 134 with locking pin 136. The second link rod 134 may be configured to attach to boom 16 by any arrangements that would be apparent to a person having ordinary skill in the art. Similarly, the first link rod 120 may be configured to attach to drop line 44 by other arrangements that would be apparent to a person having ordinary skill in the art.

In order to adjust the tension of drop line 44 the bucket 28 is lowered to ground 42 to release excess tension from drop line 44. The secondary adjusting nut 132 is backed towards the connection end 124 of first link rod 120. The hydraulic jack nut 107 is adjusted to the first end 108 of hydraulic jack 106. A hydraulic pump (not shown) is then connected to the hydraulic jack 106 to pressurize hydraulic jack 106. As hydraulic jack 106 is pressurized the primary rod 102 is pushed in a longitudinal direction towards the first end 116 of frame housing 114. The primary adjusting nut 128 is then tightened towards the second end 118 of frame housing 114. The pressure in hydraulic jack 106 may then be released.

Although the present disclosure discloses that the drop line tensioning assembly 100 is part of dragline machine 10 and attached to drop line 44, a person having ordinary skill in the art will appreciate that drop line tensioning assembly 100 may be beneficially implemented with other similar machines and lines. Therefore, various combinations of the parts disclosed herein may be contemplated and such combinations can be implemented without deviating from the spirit of the present disclosure.

A method for retrofitting a dragline machine with drop line tensioning assembly 100 may include attaching the drop line tensioning assembly 100 to boom 16 and drop line 44 of the dragline machine 10. In some embodiments, attaching drop line tensioning assembly 100 to boom 16 and drop line 44 include connecting the connection end 124 of the first link rod 120 to the drop line 44, and connecting second link rod 134 to the frame housing 114. In some embodiments, a locking pin 136 connects the second link rod 134 to the frame housing 114. The method may further include adjusting the secondary adjusting nut 132 towards the connection end 124 of the first link rod 120 and then pressurizing the hydraulic jack 106. After the hydraulic jack 106 is pressurized to a specific pressure, the method includes adjusting the primary adjusting nut 128 towards the connection end 124 of the first link rod 120. The method may then include releasing the pressure from the hydraulic jack 106 after adjusting the primary adjusting nut 128 towards the connection end 124 of the first link rod 120. Before adjusting the tension of the drop line 44, the method may include releasing tension from hoist line 24 prior to adjusting the tension of drop line 44.

INDUSTRIAL APPLICABILITY

The drop line tensioning assembly 100 of the present disclosure has applicability for implementation and use in industrial settings such as mining, agriculture, construction, and similar machines having cable lines. The technology described may also be provided in other walking or moving excavating machines, and particularly in mining shovels.

The present disclosure provides drop line tensioning assembly 100 to help control oscillation amplitudes of suspension lines 20 on dragline machine 10, thereby reducing maintenance caused by excess tension and expansion of the suspension lines 20. By controlling tension in drop line 44 within a specified range, drop line tensioning assembly 100 provides a more constant oscillation amplitude.

The drop line tensioning assembly 100 further allows for a quicker and more efficient means of adjusting the tension on drop line 44. During operation of dragline machine 10, the tension of suspension lines 20 changes due to varying loads and various operating conditions. For example, changes in temperature may affect the slack in suspension lines 20 due to expanding and contracting components on dragline machine 10. Accordingly, the tension of drop line 44 is adjusted to increase or decrease the tension in suspension lines 20. Drop line tensioning assembly 100 allows an operator to adjust the tension with hydraulic jack 106 and reduce the number of manual steps. Accordingly, the present configuration of the drop line tensioning assembly 100 provides for increased production by reducing downtime otherwise spent adjusting the tension in drop line 44. As a result, costs associated with operation of dragline machine 10 can be less than that incurred with use of previously known systems. Moreover, the ability to more efficiently adjust tension and control oscillation amplitudes of suspension lines 20 of dragline machine 10 resulting from the present configuration allows manufactures of dragline machines 10 to provide improved functionality with use of minimal components.

While aspects of the present disclosure have been particularly shown and described with reference to the embodiments above, it will be understood by those skilled in the art that various additional embodiments may be contemplated by modification of the disclosed machines, systems and methods without departing from the spirit and scope of what is disclosed. Such embodiments should be understood to fall within the scope of the present invention as determined based upon the claims below and any equivalents thereof.

What is claimed is:

1. A tensioning assembly for a dragline machine, comprising:
    a primary rod;
    a hydraulic jack having a first end, a second end, and a center section extending between the first end and the second end, wherein the primary rod is positioned adjacent to the center section of the hydraulic jack;
    a frame housing having a first end and a second end, wherein the frame housing is anchored to the hydraulic jack between the first end and the second end of the frame housing;
    a hydraulic jack nut positioned adjacent to the first end of the hydraulic jack;
    a first link rod having a threaded portion and a connection end, wherein the connection end is configured to be connected to a line attached to the dragline machine;

a lock plate connecting the primary rod to the first link rod with a lock plate nut;
a primary adjusting nut connected to the threaded portion of the first link rod; and
a secondary adjusting nut connected to the threaded portion of the first link rod, wherein the secondary adjusting nut is positioned between the primary adjusting nut and the connection end of the first link rod.

2. The tensioning assembly of claim 1, wherein the frame housing houses the primary rod, the hydraulic jack, the lock plate, the primary adjusting nut, and the secondary adjusting nut.

3. The tensioning assembly of claim 2, wherein the first end of the frame housing is configured to be connected to a second link rod connected to the dragline machine.

4. The tensioning assembly of claim 1, wherein the connection end of the first link rod is configured to be connected to a drop line.

5. The tensioning assembly of claim 1, wherein the lock plate is welded to the threaded portion of the first link rod.

6. The tensioning assembly of claim 1, wherein the primary rod includes a threaded portion configured to engage the hydraulic jack nut.

7. A drop line tensioning assembly, comprising:
a primary rod having a threaded portion;
a hydraulic jack having a first end, a second end, and a center section located between the first end and the second end, wherein the primary rod is positioned adjacent to the center section of the hydraulic jack;
a hydraulic jack nut adjacent to the first end of the hydraulic jack, wherein the hydraulic jack nut attaches to the threaded portion of the primary rod;
a frame housing having a first end and a second end, wherein the frame housing is anchored to the second end of the hydraulic jack;
a first link rod having a threaded portion and a connection end;
a lock plate connecting the primary rod to the first link rod with a lock plate nut;
a first adjusting nut threaded onto the threaded portion of the first link rod;
a second adjusting nut threaded onto the threaded portion of the first link rod; and
a third adjusting nut threaded onto the threaded portion of the first link rod, wherein the second adjusting nut is positioned between the first adjusting nut and the third adjusting nut.

8. The drop line tensioning assembly of claim 7, wherein the frame housing houses the primary rod, the hydraulic jack, the lock plate, the first adjusting nut, and the second adjusting nut.

9. The drop line tensioning assembly of claim 7, wherein the first end of the frame housing is configured to be connected to a second link rod connected to a dragline machine.

10. The drop line tensioning assembly of claim 9, wherein the frame housing is connected with a pin.

11. The drop line tensioning assembly of claim 7, wherein the connection end of the first link rod is configured to be connected to a drop line.

12. The drop line tensioning assembly of claim 7, wherein the lock plate is welded to the threaded portion of the first link rod.

13. A method for retrofitting a dragline machine with a drop line tensioning assembly, comprising:
attaching a drop line tensioning assembly to a boom and a drop line of the dragline machine, wherein the drop line tensioning assembly comprises:
a primary rod;
a hydraulic jack having a first end, a second end, and a center section located between the first end and the second end, wherein the primary rod is positioned adjacent to the center section of the hydraulic jack;
a frame housing having a first end and a second end, wherein the frame housing is anchored to the second end of the hydraulic jack between the first end and the second end of the frame housing;
a hydraulic jack nut positioned adjacent to the first end of the hydraulic jack;
a first link rod having a threaded portion and a connection end, wherein the connection end is connected to a line attached to the dragline machine;
a lock plate connecting the primary rod to the first link rod;
a primary adjusting nut connected to the threaded portion of the first link rod; and
a secondary adjusting nut connected to the threaded portion of the first link rod, wherein the secondary adjusting nut is positioned between the primary adjusting nut and the connection end of the first link rod.

14. The method of claim 13, wherein attaching the drop line tensioning assembly to the boom and the drop line of the dragline machine, comprises:
connecting the connection end of the first link rod to the drop line;
connecting a second link rod to the frame housing; and
connecting the second link rod to the boom of the dragline machine.

15. The method of claim 14, wherein a pin connects the second link rod to the frame housing.

16. The method of claim 13, further comprising:
adjusting the secondary adjusting nut towards the connection end of the first link rod;
pressurizing the hydraulic jack; and
adjusting the primary adjusting nut towards the connection end of the first link rod.

17. The method of claim 16, further comprising releasing a tension from a hoist line associated with the drop line prior to adjusting the tension of the drop line.

18. The method of claim 16, further comprising releasing the pressure from the hydraulic jack after adjusting the primary adjusting nut towards the connection end of the first link rod.

* * * * *